US010146723B2

United States Patent
Burtch et al.

(10) Patent No.: US 10,146,723 B2
(45) Date of Patent: Dec. 4, 2018

(54) SENSOR DATA CORRELATION AND ANALYSIS PLATFORM

(71) Applicant: SIGSENSE TECHNOLOGIES, INC., Oakland, CA (US)

(72) Inventors: Matthew Thomas Burtch, Oakland, CA (US); Subodh Mukund Nijsure, Oakland, CA (US); Nicholas James McGranahan, Oakland, CA (US); Darrell Scott Mockus, Oakland, CA (US)

(73) Assignee: SIGSENSE TECHNOLOGIES, INC., Oakland, CA (US)

( * ) Notice: Subject to any disclaimer, the term of this patent is extended or adjusted under 35 U.S.C. 154(b) by 0 days.

(21) Appl. No.: 14/547,897

(22) Filed: Nov. 19, 2014

(65) Prior Publication Data

US 2015/0142998 A1 May 21, 2015

Related U.S. Application Data

(60) Provisional application No. 61/907,005, filed on Nov. 21, 2013, provisional application No. 61/906,996, filed on Nov. 21, 2013, provisional application No. 61/906,985, filed on Nov. 21, 2013.

(51) Int. Cl.
| | |
|---|---|
| *G06F 13/28* | (2006.01) |
| *G06F 13/42* | (2006.01) |
| *H04Q 9/00* | (2006.01) |
| *H04W 4/38* | (2018.01) |
| *H04L 29/08* | (2006.01) |

(52) U.S. Cl.
CPC .......... *G06F 13/4221* (2013.01); *H04Q 9/00* (2013.01); *H04W 4/38* (2018.02); *G08C 2201/93* (2013.01); *H04L 67/12* (2013.01); *H04Q 2209/10* (2013.01); *H04Q 2209/43* (2013.01); *H04Q 2209/88* (2013.01)

(58) Field of Classification Search
None
See application file for complete search history.

(56) References Cited

U.S. PATENT DOCUMENTS

| | | | | |
|---|---|---|---|---|
| 2010/0135213 A1* | 6/2010 | Au | ............... | H04W 28/22 370/328 |
| 2013/0116958 A1* | 5/2013 | Kristensson | ......... | H04B 5/0075 702/85 |
| 2013/0138716 A1* | 5/2013 | Macwan | ............... | G06Q 30/02 709/203 |
| 2013/0185022 A1* | 7/2013 | Maehata | ............ | G05B 23/0275 702/188 |

(Continued)

Primary Examiner — Elias Mamo
(74) Attorney, Agent, or Firm — One LLP

(57) ABSTRACT

Systems and methods for aggregating multiple handheld instruments into a single platform facilitating the collection and transfer of measurement data to a centralized or distributed system. The platform comprises multiple sensor heads made up of the minimum hardware required for application specific sensing with a common interface which communicates with a common interface device that provides power for the sensor, passes data from the sensor modules and transmits it to a computational platform (mobile phone, tablet or computer), and a centrally accessible system to receive data transmitted from the computation platform and stores it.

20 Claims, 4 Drawing Sheets

(56) References Cited

U.S. PATENT DOCUMENTS

| | | | | |
|---|---|---|---|---|
| 2013/0232804 A1* | 9/2013 | Teune | ................... | G01B 5/004 |
| | | | | 33/503 |
| 2013/0346017 A1* | 12/2013 | Stephens | ................ | G01B 21/16 |
| | | | | 702/150 |
| 2014/0281779 A1* | 9/2014 | Wellman | ............. | G06F 11/0706 |
| | | | | 714/746 |

\* cited by examiner

SENSOR DATA CORRELATION AND ANALYSIS PLATFORM

CROSS-REFERENCE TO RELATED APPLICATIONS

This application claims the benefit of U.S. Provisional Application, Ser. No. 61/906,985, filed Nov. 21, 2013 and entitled "Sensor Data Correlation and Analysis Platform", U.S. Provisional Application, Ser. No. 61/907,005, filed Nov. 21, 2013 and entitled "A common platform allowing multiple different sensor types to communicate wirelessly with a master device", and U.S. Provisional Application, Ser. No. 61/906,996, filed Nov. 21, 2013 and entitled "A common platform allowing multiple different sensor types to interact with a mobile computing device such as tablet or mobile phone, using a common mechanical and electrical interface", which applications are incorporated herein by reference.

BACKGROUND

1. Field

The present disclosure relates generally to handheld sensors, computation devices and a centralized network. More specifically, the present disclosure relates to utilizing an integrated system comprising one or more modular sensors which utilize a common device to communicate with a networked computational device such as a mobile phone, tablet or laptop, and utilizing that networked device to transmit data to a central server to 1) provide a common platform for the collection sensor data 2) utilize the mobile device to provide processing, present data to the user, and provide control for the various sensors, and 3) upload data from the sensors to a central database.

Numerous prior art sensor systems exist for the collection and interpretation of sensor data. Handheld instruments that collect sensor data and present a representation of the measurement to the user via on-device screens or limited communication via wired or wireless networking exist. However, all these solutions are stand-alone devices and not connected to a platform that can aggregate data across one or more devices and allow the viewing of that data by remote authorized individuals. The current devices typical require independent hardware (screens, buttons, processing) for each sensor type and this hardware is redundant across multiple instruments. Each instrument is a self-contained device. This has always presented a problem to users in the additional size, cost and inconvenience of multiple larger and stand-alone instruments.

Traditionally, users of these stand-alone instruments have had to create their own methods of extracting and recording data from the instruments. This typically consists of manually transcribing data from the instruments on to paper. This process is error prone and doesn't allow an aggregated location for the storage of collected data for analysis and record keeping by businesses. Records are manually cataloged using paper storage archival, or copied again in offices to be stored digitally.

Historically, it has been shown that the existing methods result in several deficiencies in these systems including the introduction of errors during one of the multiple transcription steps. Because of in-field field dynamics and work constraints, this data transcription frequently occurs after a non-nominal time has elapsed leading to additional errors being injected into the process. Workers in the field don't have access to data when on the job site and there are often multiple people involved during each transcription phase often introducing additional errors.

There is great value in the creation of a common platform for the instruments, reducing cost of equipment, eliminating the size and inefficiency of the hardware and being able to leverage existing computational platforms for the interpretation and presentation of collected data to workers in the field. Furthermore, there is a significant value to the automatic recording of collected data, the automated integration and layering of that data with additional contextual points (e.g. time, location, technician, etc.) and facilitated transfer of that data to central databases to business processes and accurate recordkeeping.

Field-service based measurements require human interaction to determine what measurements are required for inspection and analysis. Some solutions exist for continuous monitoring of equipment in the field, however it is it is cost prohibitive to outfit every sensor with long-range connectivity capabilities, and it is necessary to instrument every point of a system with instrumentation to effectively monitor all aspects of equipment. This approach results in having to purchase and support more sensors than are required to diagnose and maintain facilities.

Within this industry, field service management systems are focused on tracking people and inventory, determining the dispatch routes and worker locations and inventory levels. With an integrated tool set as presented herein, these records can be supplemented with equipment condition and enable more intelligent decisions around the various aspects of field service management.

Field service management as described here refers to a hosted or cloud-based system that in combination with hardware and internet service support companies in managing worker activity, scheduling and dispatching work, and ideally integrating with inventory, billing, accounting and other back-office systems.

It is thus desirable to provide a method and system for a plurality of users to interact with a centralized system using a mobile devices and modular sensor platform to collect data more effectively and transmit said data effortlessly and instantly. It is further desirable for this system to use on board sensors from the mobile device to provide additional information about the context of the sensor information, for example GPS location, time stamp, and user details.

SUMMARY

The present disclosure provides systems and methods for aggregating multiple handheld instruments into a single platform facilitating the collection and transfer of measurement data to a centralized or distributed system. This platform comprises multiple sensor heads or modules made up of the minimum hardware required for application specific sensing with a common interface which communicates with a common interface device that provides power for the sensor, passes data from the sensor modules and transmits it to a computational platform (mobile phone, tablet or computer), and a centrally accessible system to receive data transmitted from the computation platform and stores it.

There are multiple ways to create a system as mentioned, the interface between the sensor modules and the common device could be wired via several connection methods, plugging directly together or connected via cable or wireless means, and using several communications protocols, such as UART, USB, NFC, RF technologies or the like communication methods and protocols. The common base could provide some human interface to the user. The communication between the common base and the computational device could be a wired interface such as cables, a direct connection or a wireless interface such as RF communication, and could use any communication protocol supported by the computational device, such as Bluetooth, BLE, 801.11 WiFi, cellular communication or the like protocol. The computational device could comprise any processing computer such as a laptop, desktop computer, tablet, mobile phone, smart watch or the like computational device. The communication between the computational device and the server could comprise many networking protocols to communicate with the central server, including Ethernet, 802.11 WiFi, cellular networking, satellite communication or any other means of networking. Finally the central server can comprise many server or processing centers, including a remote computer, cloud infrastructure, remote database, or any other storage and computational center.

A preferred embodiment provides a system and mechanisms to cost effectively deploy and manage a wide array of sensor capabilities that accomplish the following:
a) Enable multiple sensors to be used in a common platform to eliminate redundant hardware and reduce total cost of ownership of instruments
b) Enable users to utilize existing computational hardware for the processing and human interface of multiple sensors
c) Enable users to utilize existing network enabled hardware to seamlessly transfer manually and automatically gathered sensor data to a centralized system;
d) Enable users with registered devices to receive notifications when they are within a close proximity to a designated work assignment;
e) Enable information gathered to use existing computational hardware to supplement sensor data with additional contextual information
f) Store data locally on the computational device and review historical information Another advantage of the preferred system is that it enables additional interactive user experiences such as:
a) The sharing of data between users in the field via notifications of new data collected by other users
b) Guidance though a measurement or series of measurements though software running on the computational device
c) The collection of contextual data such as time, location and identity of the user collecting data to enrich the standard data collected.

Other advantages of the preferred system and method include:
a) a mounting mechanism and design that enables a user to change sensor modules without the need for additional tools;
b) a means to transfer sensor data without errors at the time of data collection;
c) an intuitive and efficient method for users to transfer sensor data in an organized and efficient manner to a centralized storage space;
d) a method by which technical users in the field can retrieve and compare previously recorded sensor data in the field;
e) a method for tracking field technician behavior via data collected in an automated sensor collection network that can be accessed by authorized users;
f) a method that enables the use of user detection through registered user's master devices to track actions and associate these actions with a repair and maintenance profile;
g) a secure method for the transmittal of data between a centralized or distributed system network, a plurality of sensors, and a master device so only authorized users can access sensor data through a common point of entry;
h) a means to augment additional supplementary information to collected sensor data by including information generated by the computational device such as time, location and unique identifier that can be associated with a user;
i) a means to correlate and compare data collected with intelligent equipment models known to the computational device or central server.

Thus, the embodiments of the present disclosure provide a more effective platform for sensor data collection spanning multiple measurement types to improve experience for the purposes of diagnostic, preventative maintenance and repair. In addition, the embodiments provide a more economical method for using multiple sensors in the field and the upload and aggregation of sensor data to a centrally accessible platform using the network connection existing in the computational device.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

Figure 1:
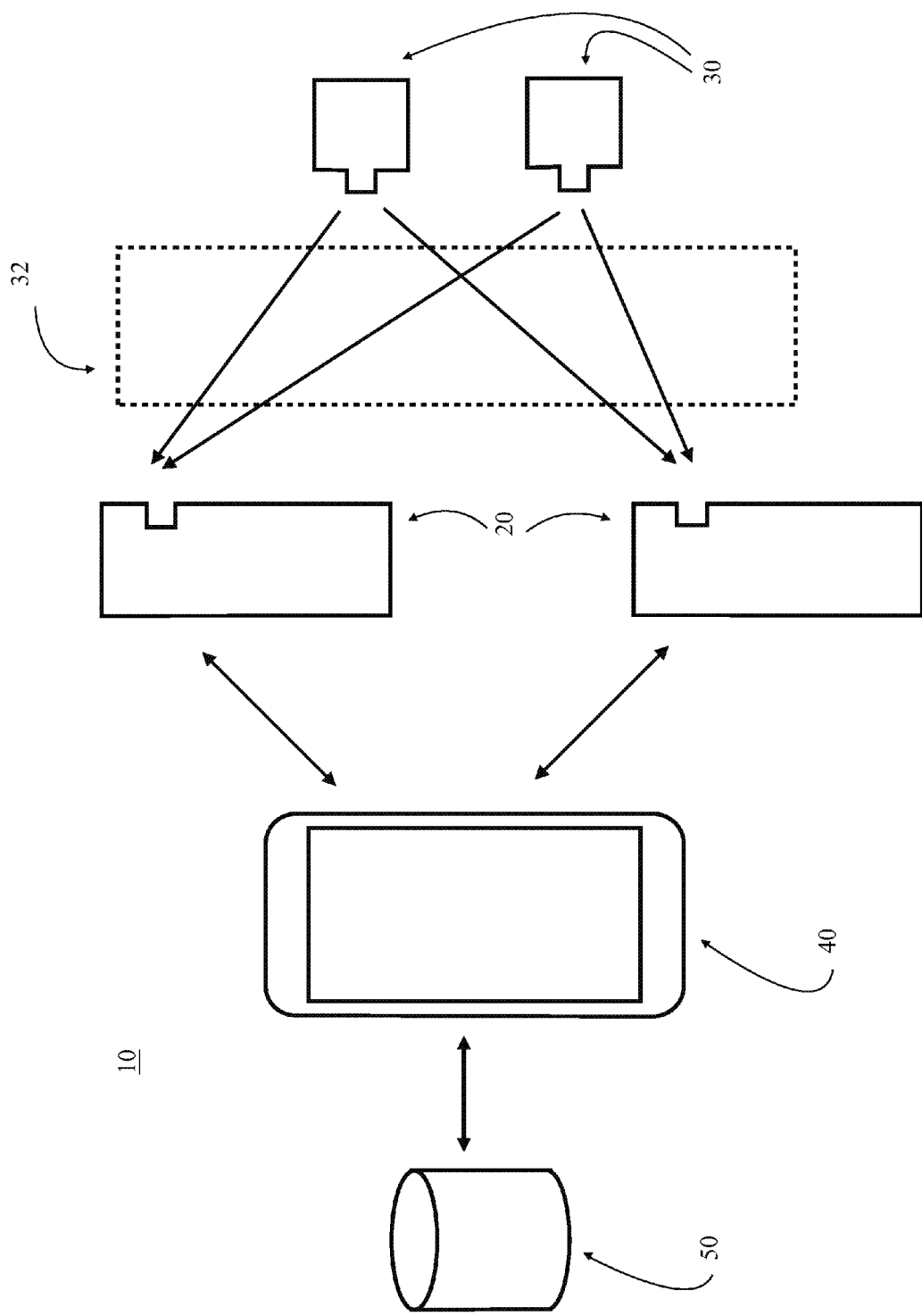
FIG. 1 is a block diagram of the system.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION OF THE PREFERRED EMBODIMENT

With initial reference directed to FIG. 1 of the appended drawings, a system 10 comprising a plurality of sensor modules 30 connected via a data connection 12 comprising a common mechanical and electrical interface to a common hardware base or interface device 20 which provides power and interface between a sensor module 30 and a computational device 40 comprising a computer, laptop, tablet, phone and the like. The computational device 40 then transmits recorded data, either automatically or via user direction to the central server 50.

Figure 2:
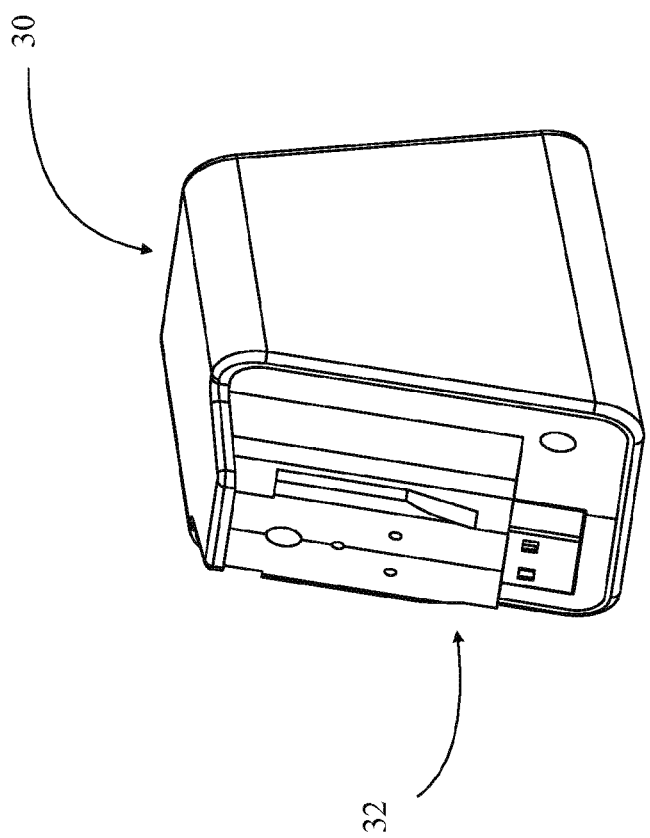
FIG. 2 is an isometric view of an example sensor module.

FIG. 2 shows an example implementation of a sensor module 30, comprising a common interface (e.g., USB) 32 between the module 30 and the interface device 20.

Figure 3:
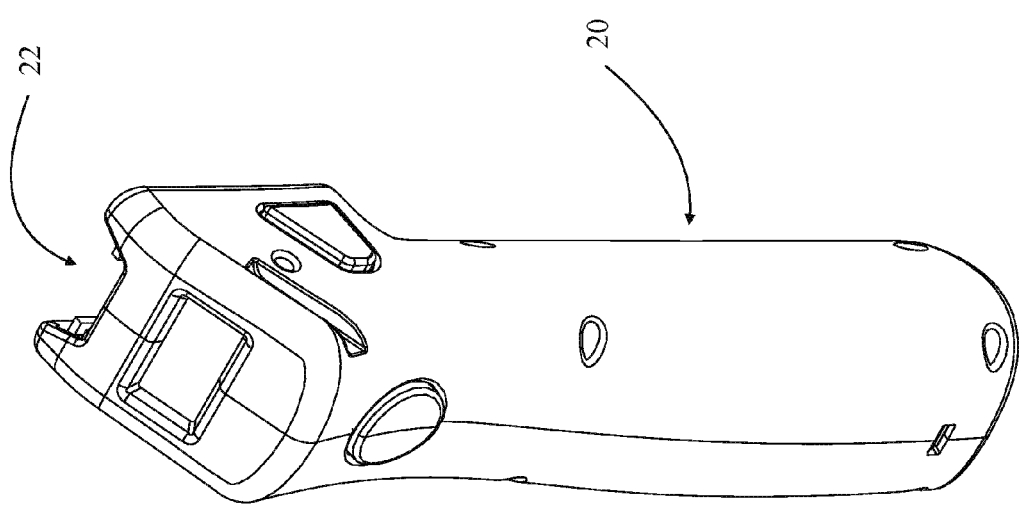
FIG. 3 is an isometric view of the common base for the central modules.

FIG. 3 shows an example implementation of the common interface device 20, which communicates with the sensor modules 30 through a common interface 22 and communicates to the computational device 40.

Figure 4:
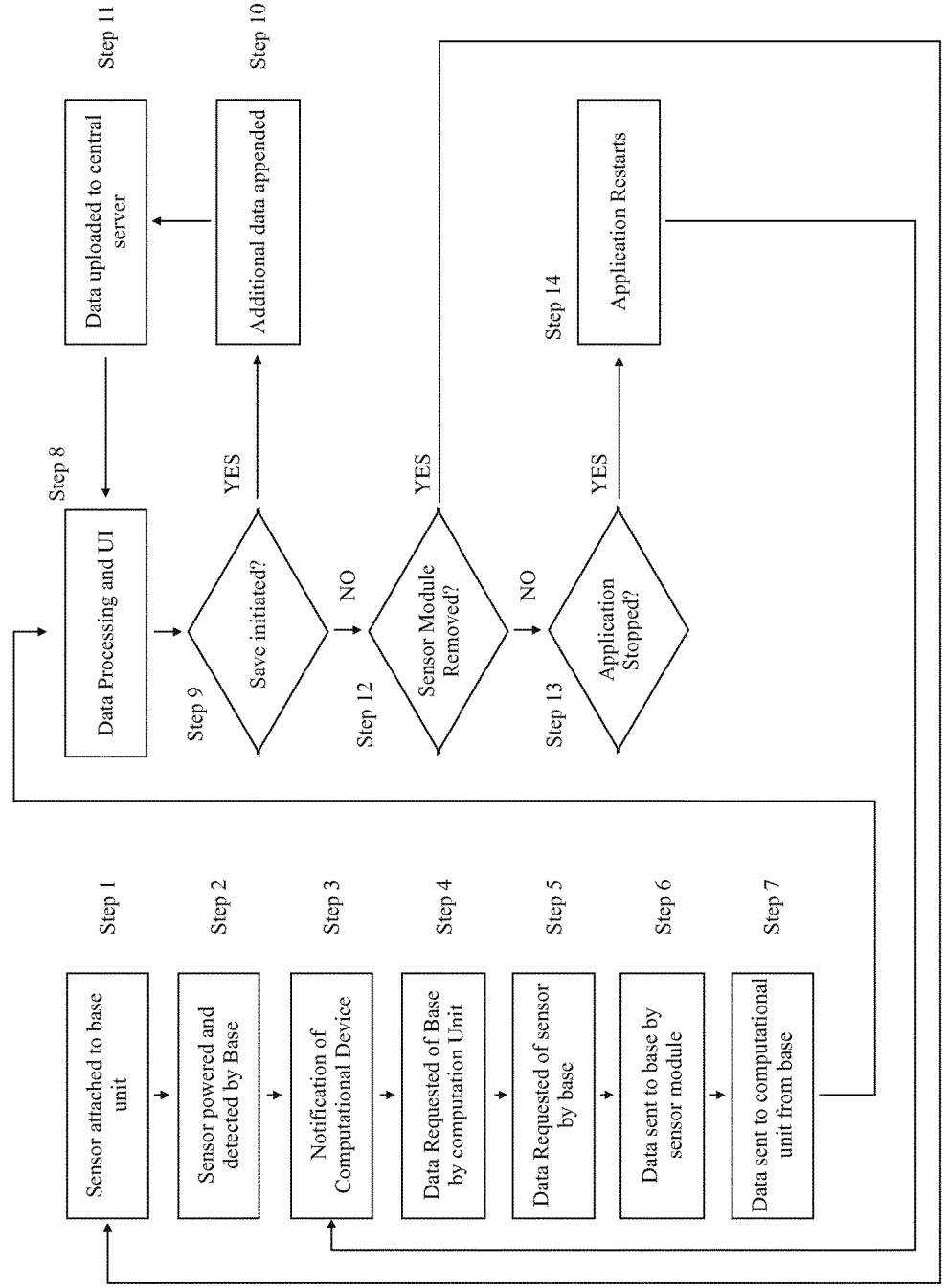
FIG. 4 shows a flow diagram of an example method operation.

FIG. 4 shows a flow diagram of the typical operation.

Step 1: A sensor module 30 is attached to the common base unit 20. This connection between the sensor module 30 and the common base 20 is performed by the user by physically attaching the two components.

Step 2: The base unit 20 provides power to the sensor unit 30 and detects the attachment. This power can be provided via the connector or some other mechanism, such as wireless charging, or other power transfer technique. The notification of the sensor attachment can be via any digital, analog, mechanical or other mechanism to convey the information to the base unit 20 of an attached sensor 30.

Step 3: The base unit 20 sends a message to the computational device 40 to inform the software of the attached sensor 30—or—the computational device 40 requests information about the attached sensor 30 from the base unit 20. The computational unit 40 running a specific application can then either be notified that a sensor 30 is attached to the base unit 20, or it can request this information from the base unit 20. This communication is performed through whatever mechanism the base unit 20 is communicating with the computational unit 40. In a preferred embodiment this communication occurs via Bluetooth, however Bluetooth Low Energy, WiFi or other wireless communication methods, wired communication such as UART, USB, etc. or any other means of digital or analog communication.

Step 4: The computational unit 40 requests one or more sensor readings from the base unit 20. The request is sent from the computational unit 40 to collect data from the sensor module 30, this could be initiated by the user or triggered automatically by the detection of the attached sensor module 30.

Step 5: The base unit 20 requests one or more sensor readings from the attached sensor module 30. The request from the computational unit 40 is relayed by the base unit 20 and the sensor reading is initiated. This request of the sensor module 30 may be a command to enter data acquisition mode for some modules or just the base starting to retrieve data sent by the module, in the case where data is automatically collected by the sensor module 30 without previous intervention.

Step 6: The sensor module 30 sends one or more sensor readings to the base unit 20. This may be the actual starting of a sampling sequence and transmission of the data, or just the transmission of data which was previously being collected, as mentioned in step 5. Additionally, the data provided by the sensor module 30 may be a single sample point, or a stream of multiple data points.

Step 7: The base unit sends one or more sensor readings to the computational device 40. The data sent from the sensor module 30 to the base unit 20 is then relayed by the base unit 20 to the computational device 40 via any means, as mentioned in step 3.

Step 8: The base unit 20 provides sensor specific data processing and shows information to the user. This step comprises any processing required for the interpretation and understanding of the data received in steps 6 and 7. Example processing operations that may be performed are temporal filtering, (ie. low pass filters, high pass filters) spatial filtering, Kalman filtering, bad data interpretations, signal amplification, digital gain correction, or any other data processing operations known or to be discovered. Additionally, data presentation and user rendering occurs and is presented to the user. This may comprise displaying numbers which represent measurements (such as temperature, pressure, etc.), showing images (as in the case of thermal imagers like microbolometers, visible light cameras, network analyzers, spectrum analyzers and other sensors), and the like.

Step 9: Readings are saved by the user. The user can optionally save the measurements displayed in step 6. This saving can comprise recording the raw data (before processing in step 6), the processed data from step 6 or the rendered output of the entire process. Additionally, it can include additional information as shown in step 8.

Step 10: Optionally the computational unit 40 can save data from other on-board sensors. These sensors may be the GPS, accelerometer, magnetometer, compass, camera, or other data if the computational device 40 is a mobile phone, or camera, Wifi information, or other parameters if the computational device 40 is a computer. Any additional information available to the computational device 40 can be added as additional information to the sensor saved data.

Step 11: Sensor data and added data is saved and uploaded to the central server 50. This upload can be performed using any digital or analog communication method. Sample embodiments of this upload mechanism may be WiFi, cellular networks, Ethernet, satellite, or other mechanism.

Step 12: Sensor module 30 removed. If either the sensor module 30 is removed from the base unit 20, or any other mechanism which results in a similar response (ie. Battery in the base unit is empty, communication is lost between the base unit 20 and computational device 40). The application readings halt and operations resume from Step 1.

Step 13: Application stopped. If the application on the computational device 40 is halted, operation will resume from Step 3 when the application is resumed (in step 12).

Step 14: Application is resumed after step 11.

From the foregoing, it will be seen that the embodiments presented herein are well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

In the description above, for purposes of explanation only, specific nomenclature is set forth to provide a thorough understanding of the present disclosure. However, it will be apparent to one skilled in the art that these specific details are not required to practice the teachings of the present disclosure.

The various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art. For example, the reader is to understand that the specific ordering and combination of process actions described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed:

1. A sensor data correlation and analysis system comprising
    one or more sensor modules, wherein each sensor module collects one or more measurements associated with one or more of diagnosis, preventative maintenance, and repair of an item being monitored; and
    a base unit operably couplable to the one or more sensor modules and to a computational device, the base unit providing a communication interface between the one or more sensor modules and the computational device, the computational device being separate from the item being monitored,
    wherein the computational device receives data comprising the one or more measurements associated with one or more of diagnosis, preventative maintenance, and repair of the item being monitored, wherein the computational device stores the measurements in a repair and maintenance profile associated with the item being monitored; and
    wherein the computational device receives a notification when the computational device is within a close proximity to the item being monitored and having a designated work assignment.

2. The system of claim 1 wherein the base unit is configured to provide power to a connected sensor module of the one or more sensor modules.

3. The system of claim 1
    wherein a measurement is one or more of a temperature measurement, a pressure measurement, a digital image, a thermal image captured by a microbolometer, data from a network analyzer, and data from a spectrum analyzer.

4. The system of claim 1 wherein individual ones of the one or more sensor modules and the base unit include first and second interface modules, wherein a connected sensor module of the one or more sensor modules and the base unit communicate over the first and second interface modules.

5. A sensor data correlation and analysis system comprising
    a central server,
    one or more sensor modules, wherein each sensor module collects one or more measurements associated with one or more of diagnosis, preventative maintenance, and repair of an item being monitored; and
    a base unit operably couplable to the one or more sensor modules, and
    a computational device in communication with the base unit and the central server
    wherein the base unit providing a communication interface between the one or more sensor modules and the computational device, the computational device being separate from the item being monitored,
    wherein the computational device receives data comprising the one or more measurements associated with one or more of diagnosis, preventative maintenance, and repair of the item being monitored, wherein the computational device stores the measurements in a repair and maintenance profile associated with the item being monitored; and
    wherein the central server is configured to transmit a notification to the computational device when the computational device is within a close proximity to the item being monitored and having a designated work assignment.

6. The system of claim 5 wherein the base unit is configured to provide power to a connected sensor module of the one or more sensor modules.

7. The system of claim 5
    wherein a measurement is one or more of a temperature measurement, a pressure measurement, a digital image, a thermal image captured by a microbolometer, data from a network analyzer, and data from a spectrum analyzer.

8. The system of claim 5 wherein individual ones of the one or more sensor modules and the base unit include first and second interface modules, wherein a connected sensor module of the one or more sensor modules and the base unit communicate over the first and second interface modules.

9. The system of 5 wherein the computational device includes one or more on board sensors, wherein the individual ones of the on board sensors include one of GPS, accelerometer, magnetometer, compass, camera, and Wifi information.

10. A method comprising steps of
    coupling a sensor module to a base unit configured to couple to individual ones of a plurality of sensor modules, wherein each sensor module collects a sensor reading in the form of one or more measurements associated with one or more of diagnosis, preventative maintenance, and repair of an item being monitored;
    detecting the coupling of the sensor module to the base unit,
    providing power from the base unit to the sensor module,
    notifying a computational unit of the coupling of the sensor module to the base unit, the computational device being separate from the item being monitored, and
    sending one or more sensor readings from the sensor module to the base unit,
    wherein the sensor readings comprising measurements associated with one or more of diagnosis, preventative maintenance, and repair of the item being monitored are stored in a repair and maintenance profile associated with the item being monitored; and
    wherein the computational device receives a notification when the computational device is within a close proximity to the item being monitored and having a designated work assignment.

11. The method of claim 10 further comprising the step of the computational unit receiving information about the attached sensor module.

12. The method of claim 10 further comprising the step of the computational unit receiving one or more sensor readings from the base unit.

13. The method of claim 12 wherein the step of the computational unit receiving one or more sensor readings from the base unit includes the computational unit requesting one or more sensor readings from the base unit.

14. The method of claim 10 wherein the step of sending one or more sensor readings from the sensor module to the base unit includes the base unity requesting one or more sensor readings from the sensor module.

15. The method of claim 14 wherein the step of requesting one or more sensor readings from the sensor module includes one of user initiated or automatic triggering of a request of one or more sensor readings from the sensor module upon the base unit detecting the coupling of a sensor.

16. The method of claim 10 further comprising the step of displaying one or more sensor readings to a user at the base unit.

17. The method of claim 16 wherein the base unit is configured to conduct sensor specific data processing and display to the user.

18. The method of claim 17 wherein the data processing includes one or more of temporal filtering, spatial filtering, Kalman filtering, bad data interpretations, signal amplification, and digital gain correction.

19. The method of claim 10 further comprising the step of sensing a sensor module has been removed.

20. The method of claim 10 further comprising the step of sensing a sensing application on the computational device is halted.

* * * * *